June 18, 1963 C. R. MILLER 3,094,140
AUTOMATIC VALVE FOR COMPRESSORS
Filed Sept. 20, 1960
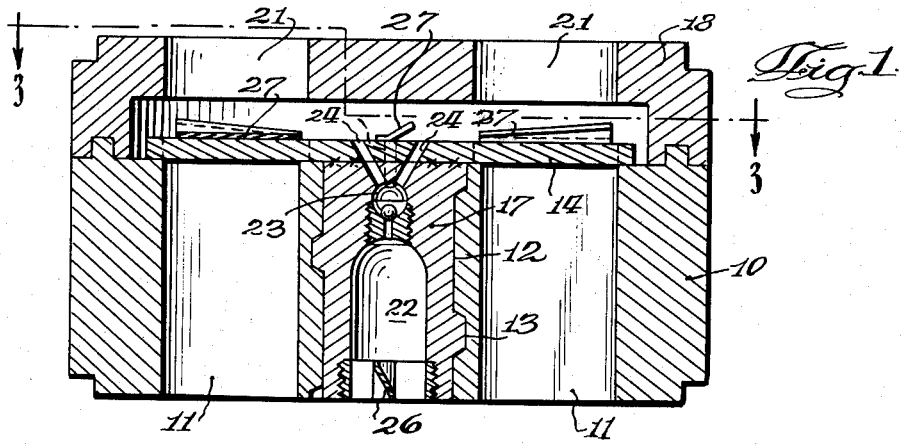
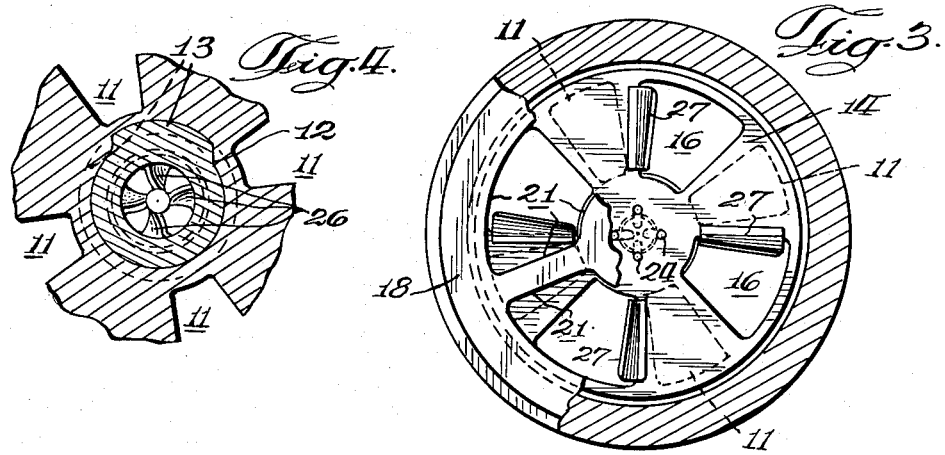
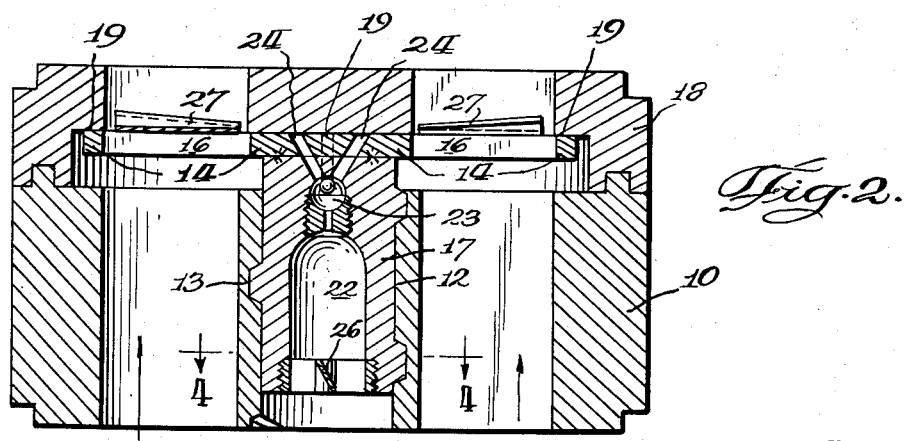
INVENTOR.
Charles R. Miller
BY
Merriam, Smith & Marshall
Attorneys United States Patent Office 3,094,140
Patented June 18, 1963

3,094,140
AUTOMATIC VALVE FOR COMPRESSORS
Charles R. Miller, R.R. 2, Box 299, Crown Point, Ind.
Filed Sept. 20, 1960, Ser. No. 57,169
2 Claims. (Cl. 137—499)

This invention relates to automatic compressor valves, and more particularly to valves for controlling the flow of fluids to and from the cylinder of a reciprocating compressor which need no springs for proper operation.

This application is a continuation-in-part of my copending application, Serial No. 7,031, filed February 5 1960, now abandoned.

The valves heretofore known for use in compressors have typically included metal springs of one type or another, used for closing the valve after the flow of fluid therethrough has ceased. These springs have been found to be a major source of operating difficulties, since the continued flexing of the spring during the operation of the compressor causes metal fatigue which eventually leads to breakage of the spring and consequent inoperability of the valve and the compressor.

In accordance with the present invention there is provided a valve for compressors which contains no springs or spring-like members, but rather uses only the flow of gas through the valve to actuate the single moving part therein. In addition to having advantages resulting from the lack of springs, the valve of the invention is also characterized by a simple, reliable construction which can be made at comparatively low cost.

The invention will be better understood from the following detailed description thereof, taken in conjunction with the accompanying drawings, in which:

FIGURE 1 is a cross-sectional side view of a valve of the invention showing the valve in its seating or closed position;

FIGURE 2 is a similar cross-sectional view showing the valve in the unseating or open position;

FIGURE 3 is a partial sectional top view of the valve taken along the line 3—3 of FIGURE 1; and FIGURE 4 is a partial sectional view along the line 4—4 of FIGURE 2.

As shown in the drawings, the valve of the invention comprises a valve seat 10, preferably circular in cross-section as shown in FIGURE 3, which is provided with a number of roughly sector-shaped main passages or ports 11 for fluid flow.

Movable valve plate 14 is arranged to block the flow of gas through ports 11 in seat 10 when the plate assumes the position abutting the gas passages 11 shown in FIGURE 1. Plate 14 is equipped with a number of openings 16 which match in number and general configuration the passages 11 in the seat.

Valve seat 10 is provided with a centrally located threaded socket or bore 12 which is internally threaded with coarse threads 13. Valve plate 14 is further provided with a rigidly-connected central shaft 17 which fits within socket 12 and has threads which match those in the socket 12. It will be seen that the threads cause valve plate 14 to be displaced as it moves between the closed position of the valve shown in FIGURE 1 and the open position shown in FIGURE 2. The extension of valve plate 14 out of socket 12 is limited by damping surfaces 19 of valve guard 18 against which the valve plate 14 comes to rest. Valve guard 18 is further provided with openings 21 which form a part of the main passageway for fluid when the valve plate assumes the position shown in FIGURE 2, in which the openings in the latter are aligned with the corresponding openings in guard 18 and seat 10.

The entire valve assembly is held together in a suitable manner, for example, by means of bolts (not shown) passing through guard 18 and into seat 10.

In the preferred embodiment of the invention which is illustrated in the drawings, shaft 17 which is attached to valve plate 14 contains an auxiliary passage generally indicated at 22 for fluid flow. A ball check valve 23, jet exhaust ports 24, and vanes 26 are positioned along the auxiliary passage 22. The preferred embodiment also includes deflectors 27 on valve plate 14, which are positioned adjacent the edges of the openings 16 therein and overlying a small portion of each opening 16.

The operation of the valve will readily be understood from the following description. In the normally closed position shown in FIGURE 1, valve plate 14 rests immediately adjacent seat 10 with the openings in each of these elements being out of line, as shown in FIGURE 3. Thus, the openings 16 in plate 14 are adjacent the solid portions of seat 10 intermediate the passages 11 therein, while the solid portions of valve plate 14 cover the passages 11. Reverse flow through the valve (i.e., in a downward direction through guard 18, plate 14, and seat 10 in that order) is thereby prevented since the passageway is blocked. Such a condition would exist, for example, on the compression stroke of a compressor during which the pressure above plate 14 would be greater than that below the plate so that the firm sealing relationship of the plate would be maintained. As the compressor starts its suction stroke it creates a partial vacuum above the compressor valve. This differential pressure causes an upward lifting force to be applied to the portions of plate 14 lying above the passages 11 in seat 10. As the plate rises in response to this lifting force, threads 13 on shaft 17 cause plate 14 to rotate in a direction determined by the threads so that when the limiting position shown in FIGURE 2 is reached the plate 14 has rotated sufficiently to align the openings 16 therein with the passage openings 21 in valve 18 and passages 11 in seat 10. The valve is now in its fully open position and provides a passage for the gas entering the compressor to flow freely with a minimum of eddy losses.

The auxiliary passageway for fluid flow in shaft 17 and the deflectors 27 on valve plate 14 assist in the opening action of the valve as follows. During the compression stroke of the compressor reverse flow through the auxiliary passageway is prevented by ball check valve 23 which assumes the closed position shown in FIGURE 1. On the start of the suction stroke, however, the ball check valve permits upward flow of gas through the auxiliary passage 22, past vanes 26, valve 23 (now in the open position shown in FIGURE 2) and ports 24. The flow of gas passing vanes 26 provides a torque which is applied to shaft 17 and transmitted to plate 14, thus causing rotation and the consequent displacement thereof away from seat 10. This rotation uncovers passages 11 and permits the start of gas flow through the main passages 11 of the valve. The initial rotation of plate 14 also places deflectors 27 in the path of the initial flow of gas through passages 11. This gas flow further produces a torque on plate 14 which rapidly swings the plate to the limit of its rotation, thus fully opening the fluid passageway. It will be noted that deflectors 27 are of a size which permits them to fit within the openings 21 in guard 18 when the valve is in its open position (FIGURE 2) thus avoiding damage to the vanes and ensuring smooth operation of the valve.

At the end of the suction stroke by the compressor the fluid flow stops, thus eliminating the lifting force on plate 14 which will now tend to fall under the influence of gravity when the valve is disposed in its preferred horizontal position as shown in FIGURE 1. Regardless of the position of the valve plate 14, however, closing of the valve will be accomplished at the start of the discharge stroke by the compressor which produces a reverse flow of fluid through the main passageway. The fluid strikes deflectors 27 on plate 14, thus producing rotation in the opposite direction and causing the plate to reverse its travel and assume the closed position shown in FIGURE 1.

It will be obvious to those skilled in the art that the threads with which shaft 17 and socket 12 are equipped should be loosely fitting so that rotation of the shaft will be facilitated and any binding will be eliminated. The lead of the threads and the distance from the top of seat 10 to the damping surfaces 19 in guard 18 should be correlated, as will also be apparent, with the angular displacement between the passages 11 in seat 10 and the corresponding openings 16 in plate 14. In the closed position of the valve shown in the drawings, these openings are displaced about 45° from each other, although this is by no means a necessary condition. Accordingly, it will be apparent that plate 14 must rotate about 45° or one-eighth of a turn in order to have the openings 16 therein line up with the corresponding passages 11 in the valve seat 10. The lead of threads 13 and the distance between valve seat 10 and the damping surfaces 19 of guard 18 should accordingly be adjusted so that the latter distance represents one-eighth of the lead of the threads 13. In this way when plate 14 has reached the limit of its extension it has rotated sufficiently to line up the openings in plate 14 with those in guard 18 and seat 10.

The foregoing detailed description has been given for clearness of understanding only, and no unnecessary limitations should be understood therefrom, as modifications will be obvious to those skilled in the art.

What is claimed is:

1. In a compressor valve, a valve seat, a valve guard spaced therefrom and substantially parallel thereto, a flat circular valve plate disposed between said seat and said guard and substantially parallel thereto, said valve plate being mounted for rotation relative to said valve seat by means of a threaded shaft centrally located on said valve plate, said shaft being mounted in an internally threaded bore centrally disposed in said seat, rotation of said valve plate causing movement thereof between a first position in which said plate is adjacent and in sealing relationship with said valve seat and a second position in which said valve plate is adjacent said guard, each of said valve seat, valve guard and valve plate being provided with a plurality of main passage openings for fluid flow, rotation of said plate to said second position causing said openings to register for the passage of fluid therethrough, each of said openings in said valve plate being provided with a deflector adjacent thereto, against which deflector the fluid stream is directed when the main passage for fluid flow is partially open, whereby the valve plate is turned to the limit of its rotation by said fluid stream, said valve being provided with means for initiating the opening of said main passage for fluid flow comprising an auxiliary passageway for fluid flow through said valve plate, said auxiliary passageway being provided with check valve means and a plurality of vanes which impart rotary motion to said plate on the passage therethrough of fluid.

2. A compressor valve comprising a valve seat having a main fluid passage and a threaded bore, a valve plate displaceable from a seating position to an unseating position with respect to said valve seat, and means for displacing said valve plate from the seating position into the unseating position in response to a differential fluid pressure, said means including a threaded shaft connected to said valve plate and received in said threaded bore and further including an auxiliary passage for fluid flow through said threaded shaft and said valve plate, said auxiliary passage provided with a vane which imparts a torque to said threaded shaft and said valve plate in response to fluid passing through said auxiliary passage.

References Cited in the file of this patent

UNITED STATES PATENTS

| 957,012 | Stone | May 3, 1910 |
| 2,086,236 | Peo et al. | July 6, 1937 |
| 2,237,013 | Stanbery | Apr. 1, 1941 |
| 2,925,094 | Bancroft | Feb. 16, 1960 |

FOREIGN PATENTS

| 471,685 | Germany | Feb. 15, 1929 |